United States Patent [19]
Haymond

[11] 3,853,468
[45] Dec. 10, 1974

[54] METHOD AND APPARATUS FOR CLINICAL TESTING OF BIOLOGICAL FLUIDS

[76] Inventor: Herman Ralph Haymond, 1931 San Pasqual St., Pasadena, Calif. 91107

[22] Filed: May 8, 1972

[21] Appl. No.: 251,015

[52] U.S. Cl. .................................. 23/230 B, 424/8
[51] Int. Cl. ........................................... G01n 33/16
[58] Field of Search ................. 23/230 B; 424/8, 12; 917/161 UF, 143 A; 260/77.5 D

[56] References Cited
UNITED STATES PATENTS

| | | | |
|---|---|---|---|
| 2,770,572 | 11/1956 | Eldon .............................. | 23/230 B |
| 3,036,040 | 5/1962 | Lee et al. .................. | 266/77.5 D X |
| 3,074,853 | 1/1963 | Brewer .................................. | 424/12 |
| 3,146,163 | 8/1964 | Brewer .................................. | 424/12 |
| 3,220,978 | 11/1965 | Jaquiss .......................... | 266/77.5 D |
| 3,248,416 | 4/1966 | Stevens ....................... | 117/143 A X |
| 3,502,437 | 3/1970 | Mass ............................. | 23/230 B X |
| 3,522,072 | 7/1970 | Florence et al. .......... | 117/161 UF X |
| 3,529,788 | 9/1970 | Sasaki et al. .................. | 117/161 UF |
| 3,632,372 | 1/1972 | Heslop et al. ............... | 117/143 A X |

*Primary Examiner*—Robert M. Reese
*Attorney, Agent, or Firm*—Wm. Jacquet Gribble

[57] ABSTRACT

Biological fluids, such as blood sera, are placed individually on a testing surface like an acrylic coating alongside or in between control sera. The coating has an affinity for nonagglutinated particles. To each of the serum areas a drop of testing reagent is added and mixed. The mixtures are allowed to incubate or mature for approximately 5 to 10 minutes. An absorbent material is then applied to the test surface to remove the agglutinated particles of the mixtures from the test surface. The test area is then compared for density with the control areas and the results recorded. A preferred recordation is to dry and file the test surface upon which the serum has been tested.

8 Claims, 6 Drawing Figures

PATENTED DEC 10 1974                                       3,853,468
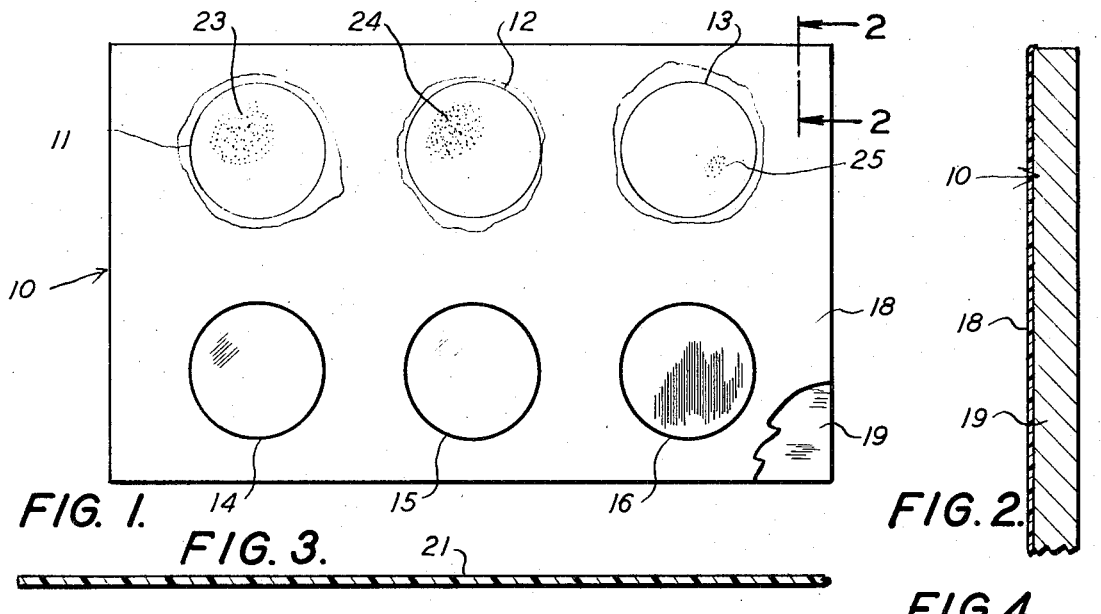
FIG. 1.    FIG. 3.    FIG. 2.
FIG. 4.
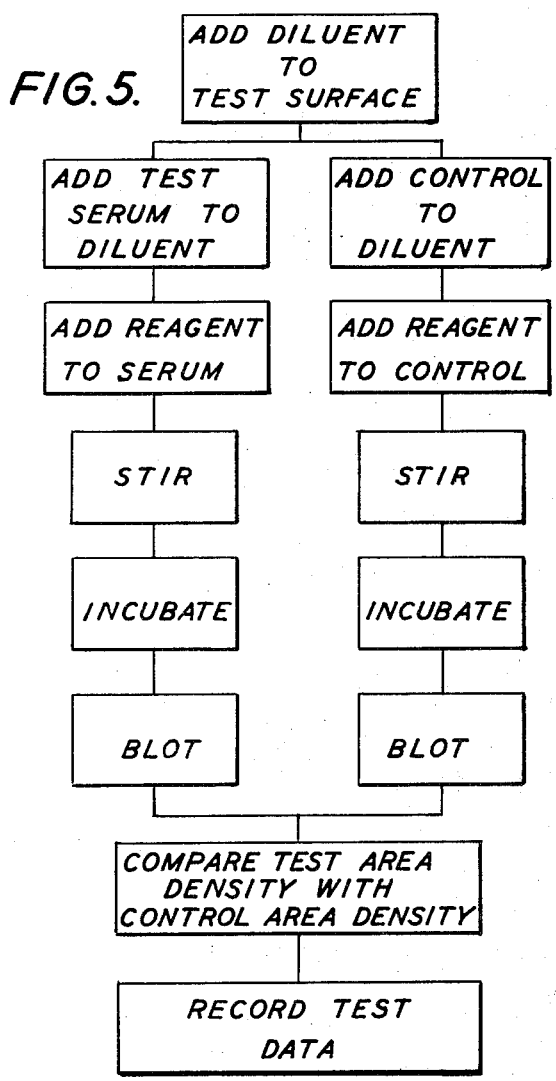
FIG. 5.
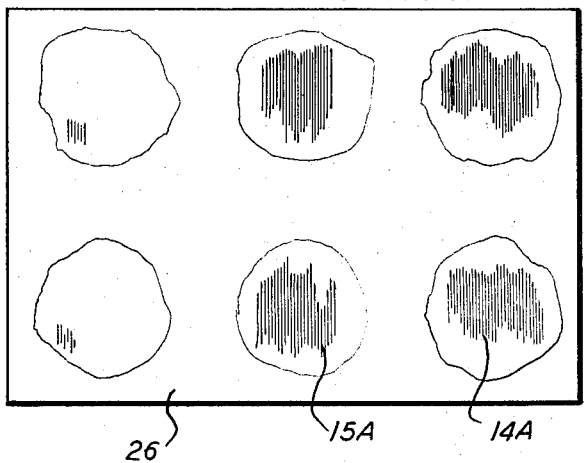
FIG. 6.

મ3,853,468

METHOD AND APPARATUS FOR CLINICAL TESTING OF BIOLOGICAL FLUIDS

BACKGROUND OF THE INVENTION

The invention relates to test procedures for determining the absence or presence of substances like antigens and antibodies or other blood fractions within biological fluids to determine the presence or absence of certain diseases or fluid conditions. Such biological fluids as serum, plasma, serous fluids, spinal fluid, urine, saliva and other secretions of humans and animals are encompassed by the definition "biological fluids."

An exemplary test procedure is the test for lupus erythematosus involving anti nucleo protein factors occurring in biological fluids. Similar test techniques have been developed for the detection of rheumatoid arthritis, Hashimoto's disease and other conditions in which antibody factors occur. A common reagent to aid in detection of antibodies is an antigen preparation which may be used as a carrier or indicator and is a combination of sensitized tanned red cells and latex particles which, when combined with the antibodies, produces a less soluble complex giving a visible agglutination indicating the presence of an abnormality within the biological fluid. Further background on the detection of abnormal proteins in sera may be obtained from the following references:

Rheins: J.Lab. and Clin. Med. 50:1, July 1957, pp. 113-118

Gofton: Canadian Med. Association.J., Biol. 77, Dec. 15, 1957, pp. 1098, 1102

McQueen-Williams, M. Thompson, K.W., Yale J. Biol. Med., 1939 Vol. 12, pp. 531

Singer: Amer. Jour. Med., Vol. 21, December 1956, pp. 888-892.

One of the problems in interpreting test results has been the relative difficulty of perceiving the agglutinated particle pattern indicating a positive reaction. In order to compare the agglutination pattern with the patterns of the positive control and the negative control on the test surfaces, varied colored backgrounds to enhance the agglutination visibility as well as various degrees of concentration within the reagent have been tried in order to make a more positive evaluation of the test area. The present method and apparatus of the invention achieve readily distinguishable visual indication of the positive or negative condition of the sera or other biological fluid being tested using readily obtainable, conventional materials and simple laboratory techniques combined in a unique way to solve the problem economically.

SUMMARY OF THE INVENTION

The invention contemplates a process that includes the steps of combining the test and control fluids in defined areas with a test surface having an affinity for nonagglutinated particles, adding a test reagent to each of the test and control areas, mixing the reagent and the test and control fluids, and incubating the mixtures for a period of minutes. After the incubation period an absorbent material is placed over the test surface in contact with the test and control areas such that fluid is transferred from the test surface to the absorbent material. One of the two visually marked surfaces so resulting is examined to compare the perceivable density of the test areas with the control areas and the data resulting from such inspection is recorded. Recordation may be by means of drying and filing one of the two test surfaces so determined.

In a preferred process the further step is taken of placing a drop of diluent, such as distilled water, or a buffering solution compatible with the buffer of the reagent upon the test surface in each of the control and test areas prior to placing the test fluid and the control fluids on the test surface.

A preferred test apparatus comprises a substrate coated with a synthetic material, such as an acrylic. The surface is preferably marked with defined areas for test and control fluids and may contain indicating what data is to be recorded on the test surface. Alternatively, the test surface may be a plaque of solid synthetic material, such as an acrylic plastic or other chain molecule plastic such as mylar, linear polyethylene, polycarbonate and fluorinated polycarbonates, such as Teflon.

All of these materials are commercially available and inexpensive, as are the second stage absorbent surfaces which need be no more than common facial tissue. The process of the invention is easily taught and easily performed, and results in a distinctive color differentiation between the positive and negative resultants of the test.

These and other advantages of the invention are apparent from the following detailed description and drawing.

BRIEF DESCRIPTION OF THE DRAWING

FIG. 1 is a plan view of a test surface showing test fluids at two stages of the process;

FIG. 2 is a fragmentary sectional elevation of the test surface of FIG. 1;

FIG. 3 is a fragmentary sectional elevation of an alternate test surface in accordance with the invention;

FIG. 4 is a view of an absorbent surface after contact with the test surface, such as that of FIG. 1;

FIG. 5 is a diagram of a preferred process in accordance with the invention; and FIG. 6 is a plan view of a test plaque in accordance with the invention.

GENERAL DESCRIPTION

Many substances which occur in human biological fluids can act as antigens when injected into an animal or other human and cause that animal to produce "antibodies," that is, large protein molecules or immunoglobulins, which react specifically with the antigen. One way of detecting the antigen is to prepare a tanned red cell-latex particle mixture, sensitized with the animal antibodies, which agglutinates in the presence of the antigen. The process can also be used in reverse. A tanned red cell-latex particle mixture sensitized with an antigen agglutinates in the presence of the antibodies.

In some conditions a person produces antibodies to his own natural components. These are "autoantibodies." The antinucleoprotein factor of lupus erythematosus, the antithyroglobulin factor of Hashimoto's disease, and the rheumatoid factor (a binding factor for gamma globulin) of rheumatoid arthritis are examples of autoantibodies. Red cell-latex particle mixtures sensitized with the corresponding antigens can be used to detect these autoantibodies in biological fluids.

In principle a sensitized red cell-latex particle mixture can be used to detect antibodies and autoantibodies by sensitizing the mixture with an antigen. Conversely, a sensitized mixture can be used to detect antigens by sensitizing with a corresponding antibody. In either of these examples a positive reaction would be one resulting in relatively high agglutination. Little or no residue would remain on the test surface after blotting in accordance with the inventive method.

A test can also be conducted in accordance with the invention so that agglutination is a negative indication, and non-agglutination is a positive reaction, for a substance in a body fluid. In one example a tanned red cell-latex particle mixture is sensitized with human choriogonadotropin as an antigen to form a sensitized reagent. An animal antiserum (antibody) is mixed with this reagent, causing agglutination, the degree of which is determined comparatively in accordance with the invention. No particles remain after blotting. However, if before mixing the reagent and the antiserum, the antiserum is first mixed with a urine sample known to contain the antigen choriogonadotropin, the antigen and antiserum react in solution, inhibiting the antiserum from reacting with the sensitized reagent upon subsequent mixing with the reagent and resulting in the positive test for choriogonadotropin in a urine sample being a nonagglutinating pattern. Such pattern remains on the test surface after blotting.

The same inhibiting technique applies in tests for antibody substances instead of antigen substances as in the above example.

DESCRIPTION OF THE PREFERRED EMBODIMENTS

In FIGS. 1 and 2 a test plaque 10 has a plurality of test areas defined by printed circles 11-16. Each of the circles is applied to a test surface 18 on a substrate 19 which may be conventional cardboard. Preferably the test surface 18 comprises a synthetic material, such as an acrylic, from a source like a spray of crystal-clear acrylic such as that marketed as Krylon No. 1303.

Other tests have shown that vinyl acrylic and latex paints may be applied to a substrate with very good results in terms of distinctiveness of test patterns. Contrast results ranging from good through very good to excellent have been obtained in ascending order of effectiveness from Bakelite, polyallomer plastic, acrylic paint, linear polyethylene, clear polycarbonate, stress-relieved polypropylene, plastic-coated art board for acrylic paints, mylar, polypropylene, vinyl acrylic paint, latex paint, clear acrylic Plexiglas, opaque white Teflon, opaque gray polyvinyl chloride, translucent natural Nylon and clear acrylic, either sprayed coating or sheet, and polystyrene.

In FIG. 3 the test surface is comprised of a solid sheet 21 of a chain-molecule polyplastic such as linear polyethylene or a polyvinyl chloride.

In FIG. 1 the liquid illustrated thereon at circle 11 is the positive control mixed with a reagent such as rabbit-derived antibodies in a sensitized tanned red-cell-latex particle mixture. Within circle 12 is the test fluid which may be a serum from a human and the same reagent mixed therein. Circle 13 contains the fluid from a negative control source mixed with the same reagent. Other test samples may be placed in circles 14-16. However, in the illustrative Figure, the circles 14, 15 and 16, respectively, show the residue from the representative positive, test and negative fluids of circles 11, 12 and 13 after blotting.

As can be seen from FIG. 1, agglutination areas 23 and 24 in the positive control and test circles are similar, whereas only minute agglutination is evident at 25 in circle 13 of the negative control area. A very positive test has been indicated in the upper row of FIG. 1. However, normally such a distinctive pattern does not emerge in conventional lab procedures. The instant invention accentuates such visible distinction, as is evident from circles 14, 15 and 16 showing the next stage of the test. An absorbent or blotting tissue 26 (FIG. 4) is shown as if applied to six test area circles of the test surface of FIG. 1. As the lower row of the test surface of FIG. 1 represents, the nonagglutinated particles of circle 16 tend to adhere to the test surface of the invention leaving a distinctive reddish satin while the agglutinated particles of circles 14 and 15 are transferred to the blotter or absorbent tissue of FIG. 4, as indicated by absorbent areas 15A and 14A.

The behavior of the reagent particles is believed due to the difference in polarization or ionization between agglutinated and nonagglutinated particles, which are usually tanned red cells and latex particles. It is believed that the nonagglutinated particles form a polar or ionic bond with the test acrylic surface. The agglutinated particles tend to have a weaker polarization or ionization condition and therefore are more easily transferred by the absorbent tissue. This theory is substantiated in part by further experiments with a diluent of various saline concentrations mixed with each of the liquids in the test areas and then blotted. The saline diluent, which is known to weaken the polar bond, interfered substantially with the color density of the stain remaining on the test surface.

FIG. 5 illustrates a preferred process of the invention in which a diluent such as distilled water is added to a test surface having an affinity for nonagglutinated particles, such as tanned red cells. Some of these surfaces have already been described. The diluent is added to each of the indicated test areas on the test plaque. As indicated by the diagram, the test or control serum is then added to the diluent on the test surface. The reagent is then added to the test or control serum and stirred with a neutral rod to mix the ingredients thoroughly. The test plaque with its fluid areas is then placed to one side in order to allow reaction or "incubation" of the mixtures. Each of the areas, or all of the areas, are then blotted by an absorbent material and a comparison made of the test area with the control areas on either the test or the blotting surfaces. The resultant observed data are then recorded. It has been found that different tests require different incubation periods. However, most of the incubation periods are in the range of from one minute to thirty minutes. Tests for lupus erythematosus utilizing the standard reagents and controls are best blotted after an incubation period of five to ten minutes. Other tests are as follows:

| | |
|---|---|
| Rheumatoid arthritis | 15 minutes |
| Infectious mononucleosis | 15–30 minutes |
| C-reactive protein | 15–30 minutes |

Comparison between the test areas and the control areas can be either by visual inspection or by machine. A simple opacity test can be made by exposing the areas to a light and the transmitted intensity can be measured and recorded. Reflected as well as refracted light may be used to compare the residue on the test surface in the test area and the control areas. Preferably the test plaque may be annotated and filed as a means of recording the test data.

The invention includes a preferred test plaque such as the plaque 41 illustrated in FIG. 6. The plaque 41 is shown to a reduced scale. The plaque comprises a substrate 43 which may be cardboard and a spray-applied acrylic coating 44. Test area circles 45–50 are imposed upon the test surface. The positive and negative circles are identified by indicia, as are four test areas. The top of the card may bear a space to identify the test and a space to mark the date the test is made. Such a test plaque is optimum for not only performing the test but for preserving a visual record of the test results.

The foregoing is to be regarded as illustrative only of the invention. Various modifications within the scope of the invention will occur to those skilled in the art. It is therefore desired that the invention be measured by the appended claims rather than the illustrative disclosure herein.

I claim:

1. A process for clinical testing of biological fluids by means of a buffered reagent tending to agglutinate with biological fluid components under certain known conditions and including the steps of adding a sample of the fluid to be tested to a test surface having an affinity for nonagglutinated particles, adding a sample of control fluid of known content to another area of the test surface, adding a reagent to each of the test and control fluids on the test surface, stirring each of the resulting mixtures, leaving the mixtures undisturbed for a reactant period, applying an absorbent second surface to the areas on the test surface, and removing the second surface in order to compare the test and control areas on one of the surfaces.

2. A process in accordance with claim 1 wherein the test surface comprises a synthetic material taken from the group of acrylic, poly vinyl chloride, polyethylene, fluorinated polycarbonate, polycarbonate, vinyl latex, acrylic latex, polystyrene, polypropylene and nylon plastic.

3. A process in accordance with claim 1 including the further step of placing a diluent on each area of the test surface.

4. A process in accordance with claim 3 wherein the diluent is distilled water.

5. A process for clinical testing of biological fluids by means of a buffered reagent tending to agglutinate with biological fluid components under certain known conditions and including the steps of adding a diluent to two or more areas of a surface having an affinity for nonagglutinated particles, adding a drop of biological fluid to be tested to one of the test surface areas, adding control fluid of known content to another of the areas, adding a reagent to each of the test and control fluids, stirring each of the diluent and fluid mixtures, setting aside the mixtures for a reactant period, blotting the mixture areas, comparing the resultant blotted test and control areas, and recording the correlation data thereof.

6. A process in accordance with claim 5 wherein the diluent is distilled water.

7. A process in accordance with claim 5 wherein the diluent is an antiserum.

8. A process in accordance with claim 5 wherein the reactant period the mixtures are set aside is from one to thirty minutes.

* * * * *